Nov. 16, 1954 W. H. HOGAN 2,694,675
MULTISTAGE CENTRIFUGAL RECTIFICATION APPARATUS
Filed Aug. 21, 1951
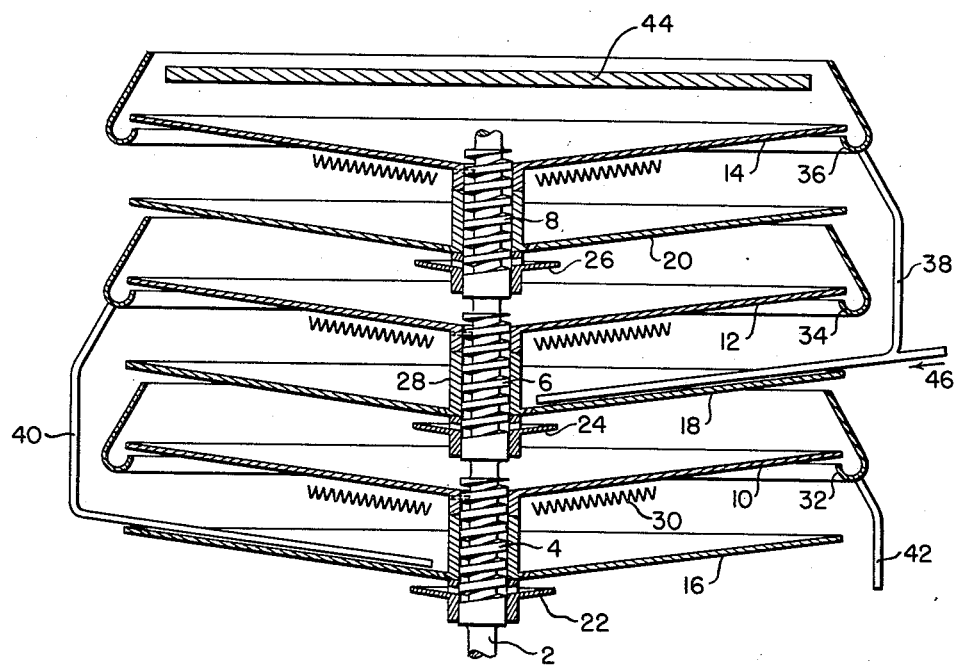
INVENTOR.
WALTER H. HOGAN
BY Kenway Jenney
Witter & Hildreth
ATTORNEYS

United States Patent Office 2,694,675
Patented Nov. 16, 1954

2,694,675
MULTISTAGE CENTRIFUGAL RECTIFICATION APPARATUS

Walter H. Hogan, Boston, Mass.

Application August 21, 1951, Serial No. 242,910

2 Claims. (Cl. 202—153)

The present invention relates to open path stills and more particularly to centrifugal stills.

Centrifugal stills have been widely used for open path distillation, particularly at low pressures, for handling materials which are sensitive to decomposition at elevated temperatures. When the separation factors of the materials are sufficiently high to permit satisfactory separation in one or two stages of operation the results have been saisfactory; however, so far as I am aware nothing corresponding to rectification by the use of a reflux has been available in centrifugal stills of conventional form.

The principal object of the present invention is to provide an improved method in apparatus for centrifugal still operation whereby a result equivalent to reflux action may be attained. With this object in view, the present invention comprises the centrifugal still hereinafter described and particularly defined in the claims.

The accompanying drawing is a sectional diagrammatic elevation of the preferred form of centrifugal still according to the present invention.

The illustrated embodiment of the invention comprises a central shaft 2 capable of being rotated at high speed. The shaft is provided with several feed screws shown at 4, 6 and 8 which are pitched in such a direction that fluid introduced at the bottom of any screw will be conveyed to the top. The shaft is mounted in suitable bearings which are not shown in detail.

Attached to the shaft is a series of vaporizing plates shown at 10, 12 and 14 preferably slightly conical in shape. These are attached to the shaft, each at the top of one of the feed screws.

Below each vaporizing plate is a condenser plate, the several condenser plates being shown at 16, 18 and 20. They are stationary and are preferably slightly conical to allow condensate to run by gravity to the lower end of each corresponding feed screw. Near the lower end of each feed screw is a small collecting plate, the several plates being shown at 22, 24 and 26. A small hole or series of small holes near the center of each condensing plate directs condensate onto the collecting plate below from which it runs directly into the bottom end of the corresponding feed screw. Each screw is suitably enclosed in a sleeve (shown at 28 for the screw 6) which is formed integral with the condensing plate itself.

The several vaporizer plates are heated by separate heating devices shown diagrammatically at 30. The heating devices may be of any suitable form, and radiant heat units are satisfactory.

Beyond the periphery of each rotating vaporizing plate is a trough. The troughs are shown at 32, 34 and 36, respectively. A pipe 38 leads from the trough 36 to the center of the condensing plate 18, a pipe 40 leads from the vaporizing plate 12 to the center of the lowest condensing plate 16, and a pipe 42 carries bottoms product from the lowermost trough 32.

A condensing plate 44 is provided at the top for condensation of the volatile product.

The condenser plates and the feed screw sleeves, as well as the collector troughs and connecting tubes, are cooled in any suitable manner to prevent extensive re-evaporation of condensates. The cooling means may be conventional and are not shown in the drawing. The apparatus may be enclosed in a chamber evacuated to a pressure low enough to allow substantially unobstructed path distillation.

In operation with three vaporizing plates as shown in the drawing, the middle plate 12 may be considered the feed plate, the upper plate 14 may be considered a rectifying section, and the lower plate 10 may be considered as part of a stripping or redistilling section. The feed material is continuously introduced into the bottom of the middle feed screw 6. This is conveniently done by means of a pipe 46 connected to the pipe 38. The mixture of feed material together with the downcoming material in pipe 38 is passed into the bottom of the feed screw where it is raised to the rotating vaporizer plate 12. The material is thrown out centrifugally on the vaporizer plate in the form of a thin film and is partially vaporized by the heaters. That part which evaporates condenses on the cold condenser plate 20 immediately above, and runs by gravity down the underside of the plate 20 to the bottom of the feed screw 8 for introduction into the rectifying section as will be presently described. The residue which is thrown off the periphery of the feed plate 12 collects in the trough 34 and is passed by the pipe 40 into the bottom of the feed screw 4 by which it is lifted to the redistilling section.

Referring now to the condensate which has condensed on the plate 20, and run down to the bottom of the feed screw 8, it is now lifted by the screw on to the rectifying plate 14. From the plate 14 a part of the material is vaporized to be condensed on the top condenser 44 as the volatile product, while the residue of this operation is collected in the trough 36 and returned by the pipe 38 to mix with the feed in the manner heretofore described. The material coming down through the pipe 38 may be considered as reflux in a manner analogous to rectification in a conventional still.

Returning now to the residue of the primary distilling operation, this is collected as heretofore noted in the trough 34 from which it is passed by the pipe 40 into the bottom of the feed screw 4 and is lifted thereby on to the lowest vaporizing plate 10. The more valatile constituents of this material are vaporized by means of the heater 30 and are condensed on the lower side of the condenser plate 18 from which they drop to the small collecting plate 24 to be mixed with the material coming in through pipes 38 and 46. The residue on the plate 10 is thrown out into the trough 32 and is withdrawn as the stripped bottom product at 42.

Although only three sections have been shown the number may be increased as desired. In any case the preferable handling is to collect material at the periphery of any vaporizer and return it to the condenser of the section next below, while condensates collected on any condensing plate are transferred to the section next above by means of the feed screws. The apparatus may therefore be constructed with as many theoretical "plates" as desired so that any desired degree of separation may be attained.

Having thus described the invention, I claim:

1. A centrifugal still comprising a rotating vertical shaft, a plurality of vaporizing plates rotatable with the shaft, a stationary condenser plate in the form of an inverted cone coaxial with the shaft and disposed beneath each vaporizing plate, heating means for the vaporizing plates, peripheral troughs for collecting residues from the vaporizing plates, vertical lift means operated by the shaft to convey material from any condenser plate to the vaporizing plate next above, and connections from certain of the troughs to the lower portions of the vertical lift means of a lower section.

2. A centrifugal still comprising a rotating vertical shaft, a plurality of vaporizing plates rotatable with the shaft, a stationary condenser plate in the form of an inverted cone coaxial with the shaft and disposed beneath each vaporizing plate, heating means for the vaporizing plates, peripheral troughs for collecting residues from the vaporizing plates, a plurality of feed screws on the shaft, one between each condenser plate and the vaporizing plate next above, and connections from the troughs to the feed screws of lower adjacent sections.

References Cited in the file of this patent

UNITED STATES PATENTS

| Number | Name | Date |
|---|---|---|
| 2,218,240 | Hickman | Oct. 15, 1940 |
| 2,313,175 | Scott et al. | Mar. 9, 1943 |
| 2,333,712 | Eckey | Nov. 9, 1943 |
| 2,499,158 | Perry | Feb. 28, 1950 |
| 2,562,153 | Taylor | July 24, 1951 |
| 2,585,202 | Whitney | Feb. 12, 1952 |
| 2,606,146 | Luten, Jr. | Aug. 5, 1952 |